United States Patent
Li et al.

(10) Patent No.: US 8,359,944 B2
(45) Date of Patent: Jan. 29, 2013

(54) ROBOT ARM

(75) Inventors: Shen-Chun Li, Taipei Hsien (TW); Shou-Kuo Hsu, Taipei Hsien (TW); Yung-Chieh Chen, Taipei Hsien (TW); Hsien-Chuan Liang, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 471 days.

(21) Appl. No.: 12/730,218

(22) Filed: Mar. 23, 2010

(65) Prior Publication Data

US 2011/0192246 A1 Aug. 11, 2011

(30) Foreign Application Priority Data

Feb. 5, 2010 (TW) ................................ 99103573 A

(51) Int. Cl.
*B25J 17/00* (2006.01)

(52) U.S. Cl. ............. 74/490.03; 74/490.05; 901/16; 901/25

(58) Field of Classification Search ............... 74/490.01, 74/490.02, 490.03, 490.04, 490.05, 490.06; 901/16, 18, 19, 25, 28, 29
See application file for complete search history.

(56) References Cited

U.S. PATENT DOCUMENTS

| | | | |
|---|---|---|---|
| 6,249,342 B1 * | 6/2001 | Cheng | 356/237.2 |
| 6,330,837 B1 * | 12/2001 | Charles et al. | 74/490.06 |
| 6,499,649 B2 * | 12/2002 | Sayama et al. | 228/112.1 |
| 6,974,297 B2 * | 12/2005 | Brogårdh | 414/680 |
| 2003/0172834 A1 * | 9/2003 | De-Gol | 104/53 |
| 2012/0042740 A1 * | 2/2012 | Isobe | 74/89 |

* cited by examiner

*Primary Examiner* — David M Fenstermacher
(74) *Attorney, Agent, or Firm* — Altis Law Group, Inc.

(57) ABSTRACT

A robot arm includes a circular rack, an elongated first mounting member attached to the rack, and a second mounting member attached to the first mounting member. The first mounting member extends in a radius direction of the rack and moves in a circular trace along the rack. The second mounting member slides relative to the first mounting member along the radius direction, thereby defining a polar coordinate system in a plane defined by the rack to allow the second mounting member to flexibly locate at any desired positions in the plane.

13 Claims, 2 Drawing Sheets

ROBOT ARM

BACKGROUND

1. Technical Field

The disclosure relates to robot arms, and particularly, to a robot arm moving in a polar coordinate system.

2. Description of Related Art

Robot arms are widely used in test procedures. These typical robot arms move linearly along three axes of a three-dimensional coordinate system. However, they are relatively complex in structure and not flexible.

DETAILED DESCRIPTION

Figure 1:
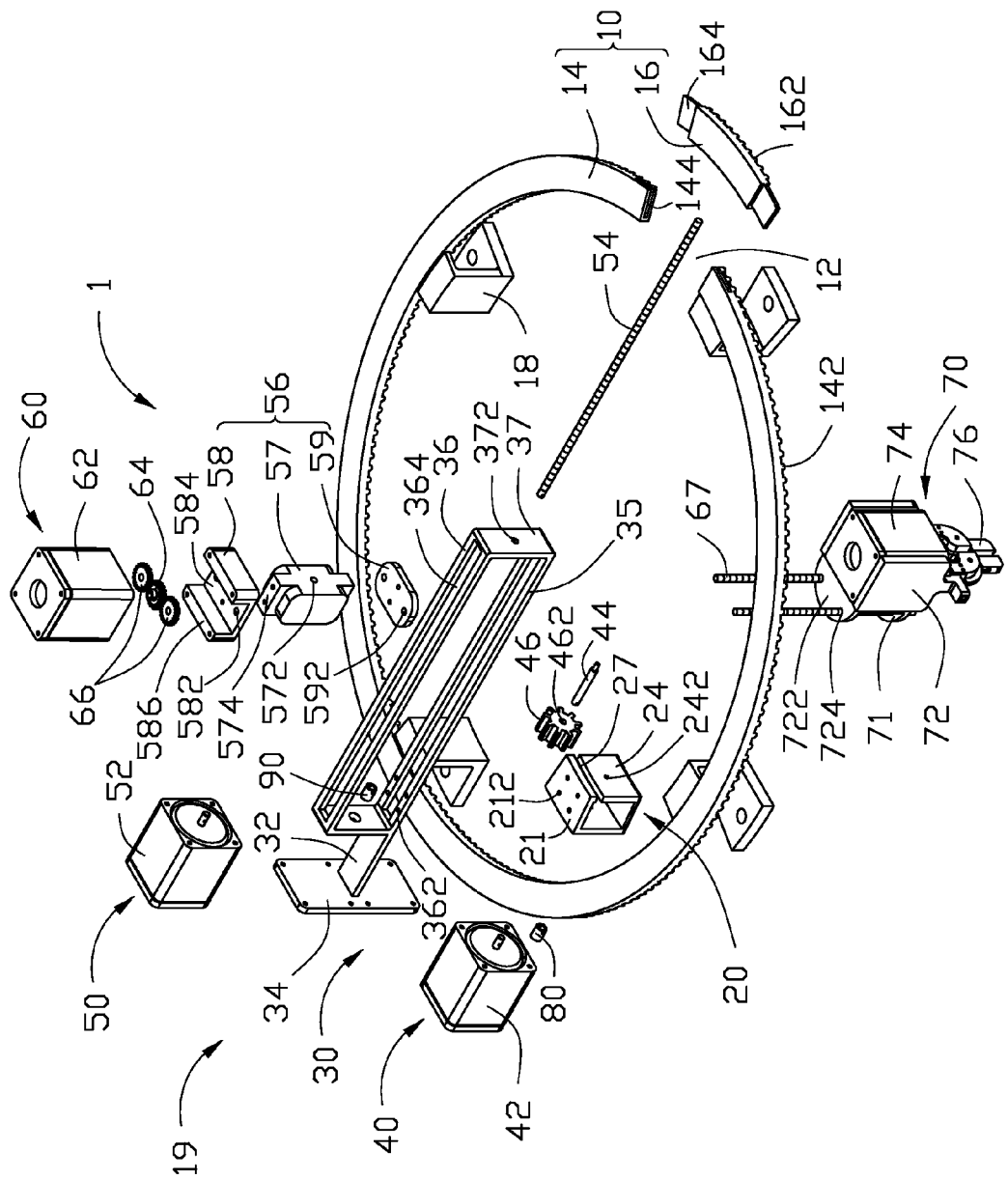
FIG. 1 is an exploded, isometric view of an exemplary embodiment of a robot arm.

Referring to FIG. 1, an exemplary embodiment of a robot arm 1 includes a circular rack 10 and a sliding assembly 19 sliding along the rack 10. The sliding assembly 19 includes a first driving mechanism 50 attached to the rack 10 via a first mounting member 30, a second driving mechanism 60 attached to the first mounting member 30 via a second mounting member 56, a third driving mechanism 40 attached to the first mounting member 30 via a third mounting member 20, and a fourth driving mechanism 70 coupled to the second driving mechanism 60 via a fourth mounting member 71.

The rack 10 includes a first circle portion 14, and a second circle portion 16 detachably connecting to the first circle portion 14. The first circle portion 14 includes an entry 12 defined between two opposite end portions thereof. The first circle portion 14 includes two receiving grooves 144 respectively defined in the two opposite end portions thereof. The second circle portion 16 includes a pair of tips 164 respectively extending from two opposite end portions thereof, for engaging in the receiving grooves 144 of the first circle portion 14, respectively. Pluralities of teeth 142 and 162 are respectively formed on bottom surfaces of the first circle portion 14 and the second circle portion 16. A plurality of C-shaped fixing brackets 18 is fixed to an inside of the first circle portion 14.

The first mounting member 30 includes a connecting plate 32, a frame 35 formed at an end of the connecting plate 32, and a retaining plate 34 perpendicularly formed at the other end of the connecting plate 32. The frame 35 includes two horizontal sidewalls 36 and two vertical end walls 37. An elongated sliding slot 364 is defined in each of the two horizontal sidewalls 36. A plurality of fixing holes 362 is defined in the lower horizontal sidewall 36 beside the sliding slot 364. A through hole 372 is defined in each of the vertical end walls 37.

The second mounting member 56 includes a U-shaped bracket 58, a sliding block 57, and a connecting board 59. Two sliding bars 574 respectively extend from two opposite ends of the sliding block 57. A threaded hole 572 is defined in the sliding block 57. The bracket 58 includes a base wall 584, and a pair of sidewalls 586 perpendicular to the base wall 584. Two through holes 582 are defined in the base wall 584. Two through holes 592 are defined in the connecting board 59.

The third mounting member 20 is generally a cubic hollow sleeve and includes a pair of first sidewalls 21, and a pair of second sidewalls 24 perpendicular to the first sidewalls 21. A through hole 242 is defined in each of the second sidewalls 24. An avoiding slot 27 is defined in one of the second sidewalls 24 close to one of the first sidewalls 21. A size of the avoiding slot 27 is slightly greater than a thickness of a wall of each of the fixing brackets 18 of the rack 10. A plurality of mounting holes 212 is defined in the one of the first sidewalls 21, corresponding to the fixing holes 362 of the first mounting member 30.

The first driving mechanism 50 includes a motor 52, a threaded pole 54, and a coupling member 90.

The second driving mechanism 60 includes a motor 62, an active gear 64, two passive gears 66 each with a central hole, and a pair of threaded poles 67.

The third driving mechanism 40 includes a motor 42, a shaft 44, a coupling member 80, and a gear 46. The gear 46 includes a central hole 462 defined therein.

The fourth driving mechanism 70 includes a motor 74. The fourth mounting member 71 includes a bracket 72 for holding the motor 74 therein. Two extension plates 722 are formed at a side of the bracket 72. Two threaded holes 724 are defined in each extension plate 722. Two clamps 76 are coupled to the motor 74.

Figure 2:
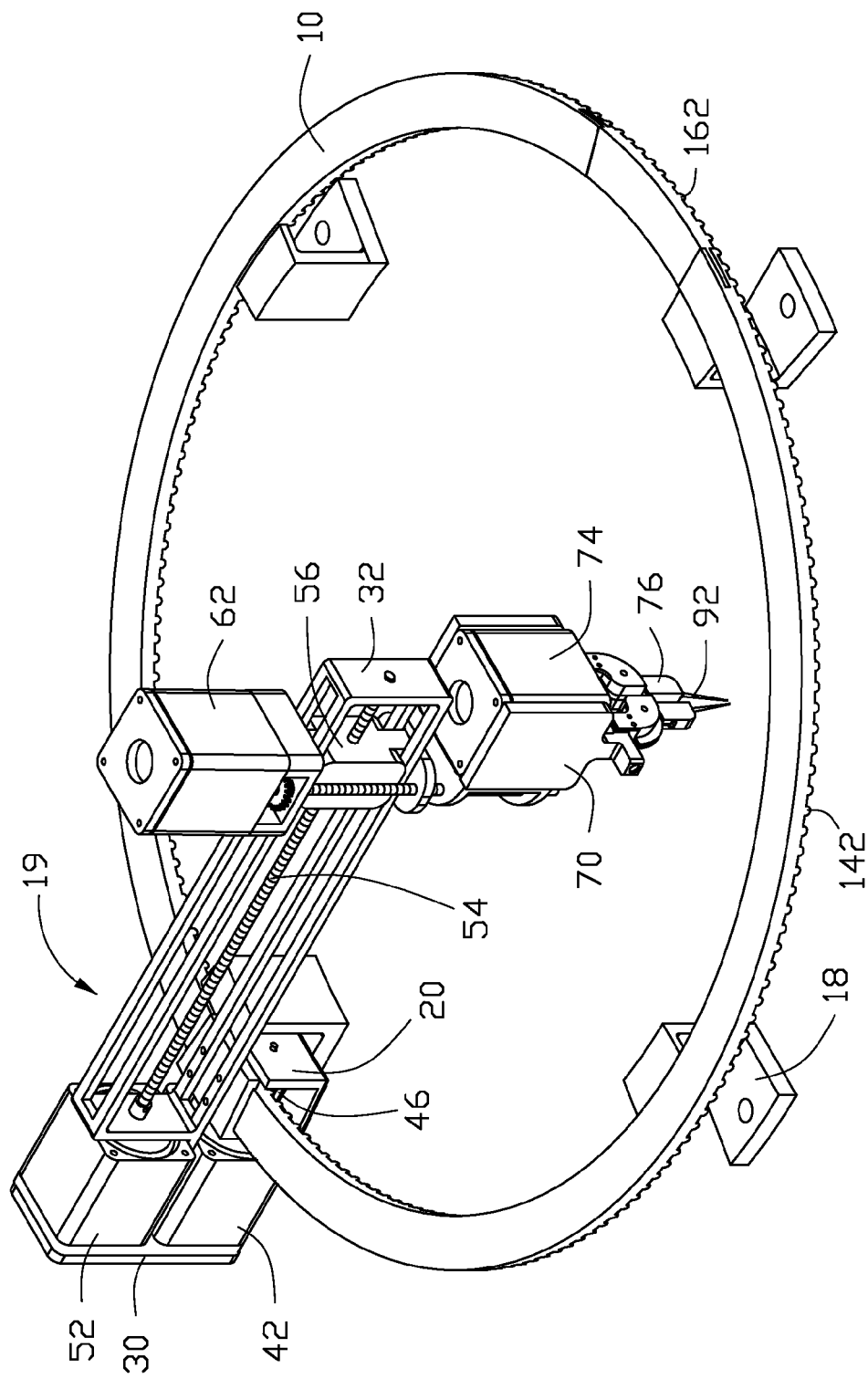
FIG. 2 is an assembled view of the exemplary robot arm of FIG. 1.

In this embodiment, the motors 42, 52, 62, 74 are servomotors.

referring to FIGS. 1 and 2, in assembly, the third mounting member 20 is fixed around the first circle portion 14 of the rack via the entry 12. The wall of each of the support brackets 18 is capable of being received in the avoiding slot 27 of the third mounting member 20. The second circle portion 16 is attached to the first circle portion 14 with the tips 164 engaging with the corresponding receiving grooves 144, to fill the entry 12. The gear 46 of the third driving mechanism 40 is received in the third mounting member 20 and meshes with the teeth 142 and 162 of the rack 10. The shaft 44 of the third driving mechanism 40 fixedly extends through the central hole 462 of the gear 46. Two ends of the shaft 44 pivotably extend through the through holes 242 of the third mounting member 20, respectively. Thus, the third driving mechanism 40 is attached to the third mounting member 20.

The first mounting member 30 is attached to the third mounting member 20, with a plurality of fasteners (not shown) extending through the fixing holes 362 of the frame 35 to engage in the mounting holes 212 of the third mounting member 20. Therefore, the first mounting member 30 is mounted to the rack 10 and extends in a radial direction of the rack 10. The motors 42 and 52 are attached to the retaining plate 34 of the first mounting member 30, respectively located at the lower portion and the upper portion of the connecting plate 32. One end of the shaft 44 is coupled to the motor 42 via the coupling member 80.

The second mounting member 56 is movably mounted to the first mounting member 30. The sliding block 57 is received in the frame 35, with the two sliding bars 574 slidably received in the sliding slots 364 of the frame 35. The threaded pole 54 extends through one of the through holes 372 of the frame 35, the threaded hole 572 of the sliding block 57, and the other one of the through holes 372 of the frame 35 to be coupled to the motor 52 via the coupling member 90.

The bracket 58 is attached to the upper sliding bar 574 of the sliding block 57 and the connecting board 59 is attached to the lower sliding bar 574. The active gear 64 is coupled to the motor 62. The motor 62 is attached to the sidewalls 586 of the bracket 58. The two threaded poles 67 engage in the threaded holes 724 of the fourth mounting member 71, threadedly extend through the through holes 592 of the connecting board 59 and the through holes 582 of the bracket 58, and fixedly engage in the central holes of the two passive gears 66. The two passive gears 66 mesh with the active gear 64. The motor 74 is received in the bracket 72 of the fourth mounting member 71.

In use, the exemplary robot arm 1 is fixed to a worktable by a plurality of fasteners extending through the fixing brackets 18 of the rack 10 to engage with the worktable. In the embodiment, the two clamps 76 respectively fix two probes 92, e.g. an anode and a cathode. An article to be tested such as a printed circuit board (PCB, not shown) is placed on the worktable. The motor 42 drives the gear 46 to rotate via the shaft 44. The gear 46 meshes with the teeth 142 and 162 of the rack 10. Thus, the combined first and first mounting members 20 and 30 are driven to move in a circle along the rack 10. The motor 52 drives the threaded pole 54 to rotate in the threaded hole 572 of the sliding block 57 of the second mounting member 56. Thus, the second mounting member 56 slides along the sliding slots 364 of the frame 35 in a X-Y plane defined by the rack 10. The first and third driving mechanisms 50 and 40 form a polar coordinate system in the X-Y plane. The motor 62 drives the active gear 64 to rotate and the active gear 64 meshes with the two passive gears 66. Thus, the threaded poles 67 rotatably engage in the threaded holes 724 of the fourth mounting member 71 to move the fourth mounting member 71 to slide in a Z-direction (namely a direction perpendicular to the plane defined by the rack 10). The clamps 76 and the probes 92 can move to any desired positions to conveniently test the PCB. The motor 74 drives the clamps 76 to adjust a distance between the probes 92.

In other embodiments, the second driving mechanism 60 can include one threaded pole 76 directly coupled to the motor 62 to drive the fourth mounting member 71.

In other embodiments, more than one sliding assembly 19 capable of being slidably attached to the rack 10 can be included.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A robot arm comprising:
   a circular rack;
   an elongated first mounting member attached to the rack and extending in a radial direction of the rack and moving in a circular trace along the rack;
   a second mounting member attached to the first mounting member and slidable relative to the first mounting member along the elongated direction of the first mounting member; and
   a first driving mechanism for driving the second mounting member to move along the first mounting member;
   wherein the first driving mechanism comprises a motor attached to the first mounting member, and a threaded pole coupled to the motor of the first driving mechanism via a coupling member and threadedly engaging with the second mounting member; the threaded pole of the first driving mechanism extends toward the center of the rack.

2. The robot arm of claim 1, wherein the second mounting member comprises a sliding block with a threaded hole defined therein; and the threaded pole of the first driving mechanism threadedly extends through the threaded hole of the sliding block to drive the second mounting member to move along the first mounting member.

3. The robot arm of claim 2, further comprising a third mounting member attached to the first mounting member and a third driving mechanism for driving the combined first and third mounting members to move in the circular trace along the rack.

4. The robot arm of claim 3, wherein a plurality of teeth is formed on the rack, the third driving mechanism comprises a motor attached to the first mounting member, a gear meshing with the rack, and a shaft pivotably securing the gear to the third mounting member; and the shaft is coupled to the motor of the third driving mechanism via a coupling member.

5. The robot arm of claim 4, wherein the first mounting member comprises a connecting plate, a frame formed at an end of the connecting plate and extending toward the center of the rack, and a retaining plate formed at the other end of the connecting plate and positioned outside the rack; and the motors of the first and third driving mechanisms are attached to the retaining plate.

6. The robot arm of claim 5, wherein the frame comprises two sidewalls and two end walls perpendicular to the sidewalls; and the threaded pole of the first driving mechanism is positioned between the two end walls.

7. The robot arm of claim 6, wherein an elongated sliding slot is defined in each of the two sidewalls of the frame, two sliding bars respectively extend from two opposite ends of the sliding block and are slidably received in the elongated sliding slots, and the second mounting member further comprises a bracket and a connecting board respectively attached to the two sliding bars of the sliding block.

8. The robot arm of claim 1, further comprising a second driving mechanism for driving a fourth mounting member to move perpendicular to a plane defined by the rack.

9. The robot arm of claim 8, wherein the second driving mechanism comprises a motor attached to the second mounting member, an active gear coupled to the motor of the second driving mechanism, two passive gears meshing with the active gear, and two threaded poles respectively engaging with the two passive gears; the two threaded poles of the second driving mechanism threadedly engage with the fourth mounting member.

10. The robot arm of claim 8, further comprising a fourth driving mechanism, wherein the fourth driving mechanism comprises a motor; the fourth mounting member comprises a bracket for holding the motor therein, the fourth mounting member and the motor of the fourth driving mechanism moves perpendicular to the plane defined by the rack.

11. The robot arm of claim 8, wherein the second driving mechanism comprises a motor attached to the second mounting member, and a threaded pole coupled to the motor of the second driving mechanism; the threaded pole of the second driving mechanism threadedly engages with the fourth mounting member.

12. The robot arm of claim 4, wherein the third mounting member comprises a pair of first sidewalls, and a pair of second sidewalls perpendicular to the first sidewalls of the third mounting member; the motor of the third driving mechanism is received in a space bounding by the first and second sidewalls of the third mounting member, and two ends of the shaft pivotably engage with the pair of first sidewalls of the third mounting member.

13. The robot arm of claim 12, further comprising a plurality of fixing brackets fixed to the rack, and an inference-avoiding slot is defined in one of the pair of second sidewalls of the third mounting member, and a size of the inference-avoiding slot is slightly greater than a thickness of a wall of each of the fixing brackets.

* * * * *